(12) United States Patent
Kishimoto et al.

(10) Patent No.: US 7,531,475 B2
(45) Date of Patent: May 12, 2009

(54) GLASS COMPOSITION THAT EMITS FLUORESCENCE IN INFRARED WAVELENGTH REGION

(75) Inventors: Shoichi Kishimoto, Tokyo (JP); Koichi Sakaguchi, Tokyo (JP); Masahiro Tsuda, Tokyo (JP); Shigeki Nakagaki, Tokyo (JP); Shigekazu Yoshii, Tokyo (JP); Yasushi Fujimoto, 13-813, Mihogaoka, Ibaraki-Shi, Osaka (JP) 567-0047; Masahiro Nakatsuka, 1425-78, Midorigaoka, Ikoma-Shi, Nara (JP) 630-0262

(73) Assignees: Nippon Sheet Glass Company, Limited, Tokyo (JP); Yasushi Fujimoto, Osaka (JP); Masahiro Nakatsuka, Nara (JP)

( * ) Notice: Subject to any disclaimer, the term of this patent is extended or adjusted under 35 U.S.C. 154(b) by 653 days.

(21) Appl. No.: 11/158,987

(22) Filed: Jun. 22, 2005

(65) Prior Publication Data
US 2006/0001005 A1    Jan. 5, 2006

Related U.S. Application Data

(63) Continuation of application No. PCT/JP03/13262, filed on Oct. 16, 2003.

(30) Foreign Application Priority Data
Dec. 25, 2002    (JP) ............................. 2002-373468

(51) Int. Cl.
*C03C 3/085*    (2006.01)
*C03C 13/04*    (2006.01)
*C09K 11/55*    (2006.01)
*C09K 11/59*    (2006.01)
*C09K 11/64*    (2006.01)

(52) U.S. Cl. .............................. 501/69; 501/37; 501/70; 252/301.4 F; 252/301.4 R; 252/301.6 R; 252/301.6 F

(58) Field of Classification Search ................. 501/37, 501/69, 70; 252/301.4 F, 301.4 R, 301.6 R, 252/301.6 F
See application file for complete search history.

(56) References Cited

U.S. PATENT DOCUMENTS

| 5,308,803 | A | * | 5/1994 | Clifford et al. ................. 501/17 |
| 5,508,235 | A | | 4/1996 | Marker |
| 6,128,430 | A | * | 10/2000 | Chu et al. .................... 385/142 |
| 6,620,748 | B1 | | 9/2003 | Sugimoto et al. |
| 7,160,824 | B2 | * | 1/2007 | Zguris et al. .................. 501/35 |
| 2002/0039472 | A1 | | 4/2002 | Takeuti et al. |
| 2003/0064878 | A1 | | 4/2003 | Sugimoto et al. |
| 2007/0117708 | A1 | * | 5/2007 | Zguris et al. .................. 501/72 |

FOREIGN PATENT DOCUMENTS

| EP | 0 985 644 | 3/2000 |
| JP | 6-296058 | 10/1994 |
| JP | 11-29334 | 2/1999 |
| JP | 11-317561 | 11/1999 |
| JP | 2000-53442 | 2/2000 |
| JP | 2000-302477 | 10/2000 |
| JP | 2001-213636 | 8/2001 |

OTHER PUBLICATIONS

"A New Fluorescence at 1.3 µm from a Bismuth Doped Silica Glass", Fujimoto et al., The Transactions of the Institute of Electronics, Information and Communication Engineers C, vol. J83-C, No. 4, pp. 354-355, Apr. 25, 2000. (abstract).
"Infrared Liminescence from Bismuth-Doped Silica Glass", Fujimoto et al., Jpn. J. Appl. Phys. vol. 40 (2001) pp. L279-L281, Part 2, No. 3B, Mar. 15, 2001.
"Bi-doped $SiO_2$ as a new laser material for an intense laser", Murata et al., Fusion Engineering and Design 44 (1999) 437-439.

* cited by examiner

*Primary Examiner*—Karl E Group
*Assistant Examiner*—Elizabeth A Bolden
(74) *Attorney, Agent, or Firm*—Hamre, Schumann, Mueller & Larson, P.C.

(57) ABSTRACT

The present invention provides a glass composition that exhibits a fluorescence function and an optical amplification function in a wide wavelength range. This glass composition includes a bismuth oxide, a silicon oxide, an aluminum oxide, and a divalent metal oxide, and the glass composition emits fluorescence in an infrared wavelength region through irradiation of excitation light, with bismuth contained in the bismuth oxide functioning as a fluorescent source.

12 Claims, 9 Drawing Sheets

# GLASS COMPOSITION THAT EMITS FLUORESCENCE IN INFRARED WAVELENGTH REGION

This application is a continuation of international application number PCT/JP03/13262, filed Oct. 16, 2003, pending.

BACKGROUND OF THE INVENTION

1. Field of the Invention

The present invention relates to a glass composition that can function as a light emitter or an optical amplification medium in the infrared region that is used in optical communications.

2. Description of the Related Art

Glass or glass-ceramic materials that include ions of a rare earth element such as neodymium (Nd), erbium (Er), praseodymium (Pr) and emit fluorescence in the infrared region have been known. Laser emission and optical amplification that were achieved using these materials were studied, mainly in the 1990s, and they are used as glass lasers or erbium doped optical fiber amplifiers in high-output laser applications and optical communications.

Fluorescence from the materials is caused by radiative transition of the 4f electron of a rare earth ion. Since the 4f electron is covered with an outer-shell electron, the fluorescence can be obtained only in a narrow wavelength region. This limits the ranges of the wavelengths of light that can be amplified and the wavelengths at which laser oscillation can occur, and thus the available wavelength range is narrow.

With consideration given to this, each of JP11(1999)-317561A and JP2001-213636A discloses an optical amplification glass. The glass composition includes a large amount (for instance, at least 20 mol %) of $Bi_2O_3$ as well as Er as a fluorescent element and that allows a wavelength range of 80 nm or longer to be used.

JP6(1994)-296058A, JP2000-53442A, and JP2000-302477A each disclose a glass composition for optical amplification. The glass composition includes Cr or Ni as a fluorescent element instead of rare earth elements and allows fluorescence to occur in a wide wavelength range.

JP11(1999)-29334A discloses a Bi doped silica glass. In this glass composition, Bi has been clustered in zeolite and thereby fluorescence is obtained over a wide wavelength range.

The glass composition disclosed in JP11(1999)-317561A and JP2001-213636A includes a large amount of $Bi_2O_3$ and has a high refractive index, and thus a wavelength range in which the fluorescence is obtained or light can be amplified is enlarged. However, since the fluorescent source is Er, the extension of the wavelength range is limited to about 100 nm. In addition, the refractive index of the glass composition is as high as about 2. Accordingly, when it is connected to a silica glass optical fiber that is generally used in optical communications, a problem tends to occur that is caused by reflection at the interface therebetween.

The glass composition disclosed in JP6(1994)-296058A contains $Al_2O_3$ as a main component as well as Cr, and does not contain a glass network former or contains only a small amount (at most 20 mol %) of a glass network former. Therefore, the glass composition does not have a sufficient glass forming ability and tends to devitrify when being melted or formed.

The glass composition disclosed in JP2000-53442A and JP2000-302477A includes at least one of $Ni^+$ ions, microcrystals including $Ni^{2+}$ ions and nickel ions having a hexacoordinate structure, and fine particles of metal Ni tend to deposit. Accordingly, this glass composition also tends to devitrify.

In the silica glass disclosed in JP 11(1999)-29334 A, Bi has been clustered and therefore respective Bi elements are extremely close to each other. Hence, deactivation tends to occur between adjacent Bi elements, which results in lower efficiency in optical amplification. Since this silica glass is produced using a sol-gel method, the occurrences of shrinkage during drying and cracks during baking are problems in mass production of large-sized glass or optical fibers.

Accordingly, in the wavelength range for optical communications, only the wavelength range in which a rare earth element such as Nd, Er and Pr emits fluorescence can be used for optical amplification. The other wide wavelength range is difficult to use for optical communications, since transmission loss cannot be compensated by optical amplification.

SUMMARY OF THE INVENTION

The present invention is intended to provide a new glass composition that exhibits a fluorescence function and an optical amplification function in the infrared wavelength region, particularly in a wide wavelength range that is used in optical communications, and that does not readily devitrify.

A glass composition of the present invention includes a bismuth oxide, a silicon oxide, an aluminum oxide and a divalent metal oxide, and emits fluorescence in the infrared wavelength region through irradiation of excitation light, with bismuth contained in the bismuth oxide functioning as a fluorescent source.

DESCRIPTION OF THE PREFERRED EMBODIMENTS

Figure 1:
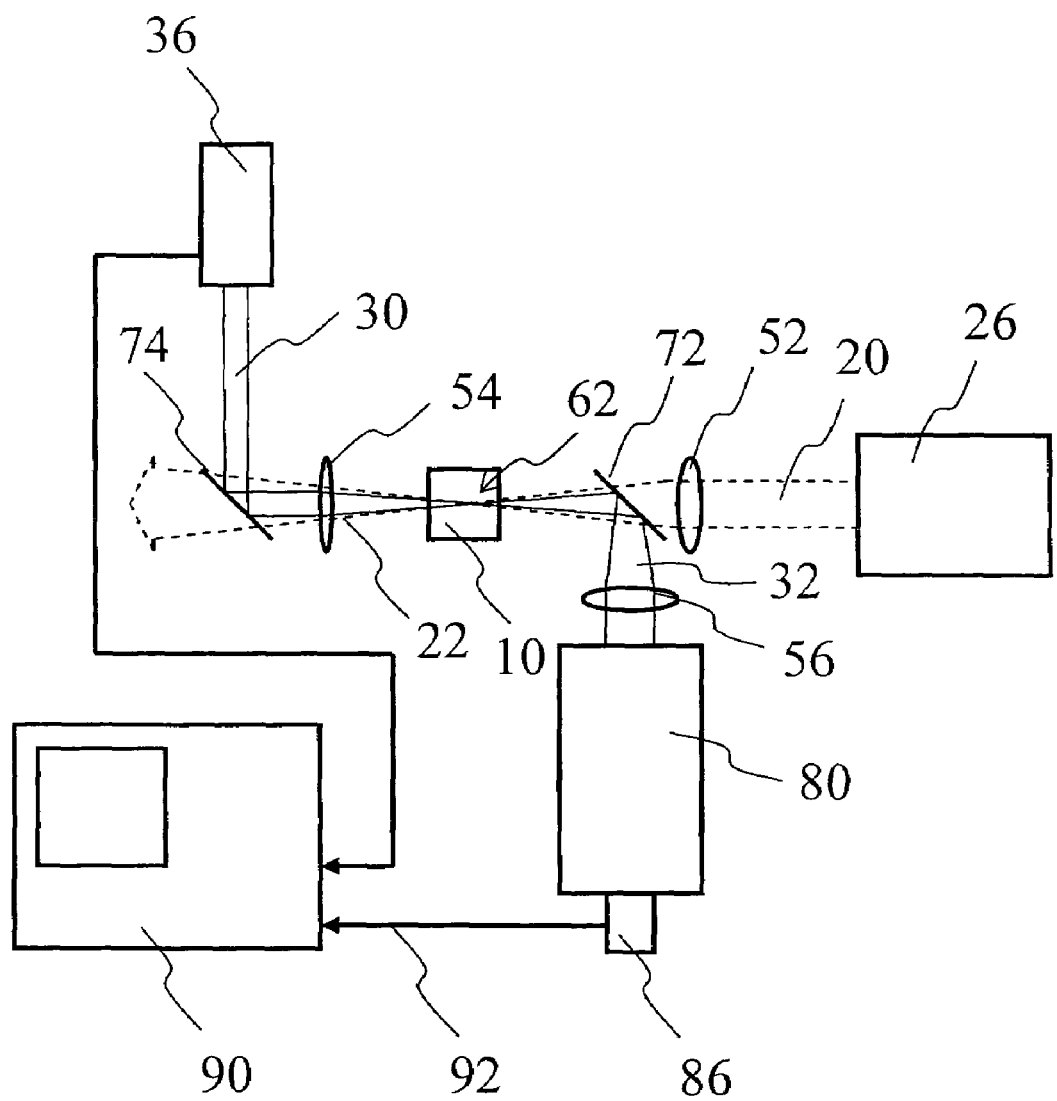
FIG. 1 is a diagram showing a light amplifier according to the present invention that was used as an optical system for evaluating optical amplification characteristics.

In the present invention, a suitable divalent metal oxide is at least one selected from MgO, CaO, SrO, BaO, and ZnO.

Preferably, the glass composition of the present invention has an optical absorption peak in the wavelength range of 400 nm to 900 nm. The glass composition may have an optical absorption peak in at least one wavelength range selected from 450 nm to 550 nm, 650 nm to 750 nm, and 750 nm to 850 nm.

In this specification, the minimum values (local minima) in a light transmission spectrum are defined as "optical absorption peaks". When the ratio of the light absorption coefficient at a peak to that at the base line of the peak in a light absorption spectrum is 0.1 or more, the peak can be clearly defined as an optical absorption peak.

In the wavelength range of 750 nm to 850 nm, some spectra have obvious optical absorption peaks and other spectra have so-called absorption shoulders. One example of the absorption shoulders can be observed in the light absorption spectrum of Example 4 in FIG. 4. In the spectrum, the shoulder is a portion that slightly projects downward in a range of about 750 nm to 900 nm. The absorption shoulders should be considered as being included in the optical absorption peaks.

Preferably, the wavelength range of excitation light is 400 nm to 900 nm, more preferably 400 nm to 850 nm. It is particularly preferable that the wavelength range of excitation light is 400 nm to 600 nm, 650 nm to 750 nm or 750 nm to 900 nm. When excitation light in one of these ranges is irradiated to the glass composition, the maximum intensity of the fluorescence can be observed in a range of 1000 nm to 1600 nm and a half-height width with respect to the wavelength of the fluorescence intensity can be at least 150 nm, for example 150 nm to 400 nm.

The bismuth cations have different surroundings for coordination, and a fluctuation of the surroundings influences the half-height width of the fluorescence intensity. The half-height width of the fluorescence intensity from the glass composition can be wider than that from rare earth elements such as Nd, Er and Pr since the fluorescence is derived from Bi cations.

It is preferable that the glass composition have a gain in signal light amplification in at least a part of a wavelength range of 1000 nm to 1600 nm, in particular 1000 nm to 1400 nm.

In the glass composition of the present invention, an aluminum oxide ($Al_2O_3$) is an important component in emitting light as well as a bismuth oxide. The content of $Al_2O_3$ is preferably 5 to 25 mol %.

The glass composition preferably includes the following components, indicated by mol %:
  55 to 80 $SiO_2$;
  5 to 25 $Al_2O_3$;
  0 to 15 $Li_2O$;
  0 to 5 $Na_2O$;
  0 to 5 $K_2O$;
  0 to 40 MgO;
  0 to 30 CaO;
  0 to 5 SrO;
  0 to 5 BaO;
  0 to 25 ZnO;
  0 to 10 $TiO_2$;
  0 to 5 $ZrO_2$; and
  0 to 10 $B_2O_3$.

The total content of the divalent metal oxide, for example the total of MgO+CaO+SrO+BaO+ZnO, is preferably in a range of 0.1 mol % to 40 mol %, and the content of the bismuth oxide is preferably in a range of 0.01 mol % to 5 mol % in terms of $Bi_2O_3$. The glass composition preferably includes $Li_2O$ as an essential component (the content of $Li_2O$>0 mol %) and the content of $Li_2O$ is preferably more than 0 mol % and not more than 15 mol %, more preferably 1 to 15 mol %.

The glass composition of the present invention may be substantially free from Nd, Er and Pr, and may be substantially free from Ni and Cr. The expression of "substantially free from" a component means that the content of the component is less than 0.1 mol % in terms of the most stable oxide in the glass composition.

The transparent glass-ceramics formed from the mother glass of the above-described glass composition also can exhibit a fluorescence function or an optical amplification function. From another aspect, the present invention provides transparent glass-ceramics that include a bismuth oxide, a silicon oxide, an aluminum oxide, and a divalent metal oxide, and the glass composition emits fluorescence in an infrared wavelength region through irradiation of excitation light, with bismuth contained in the bismuth oxide functioning as a fluorescent source. All the description for the preferred embodiments of the glass composition in this specification can be applied to the preferred embodiments of the transparent glass-ceramics.

The present invention provides a glass composition containing Bi that can exhibit a fluorescence function and an optical amplification function in a wide wavelength range in the infrared region. The glass composition may include a bismuth oxide, a silicon dioxide ($SiO_2$), an aluminum oxide ($Al_2O_3$) and one or two kinds of divalent metal oxides as essential components and these components prevent the glass composition from devitrifying. These components form a stable glass matrix and in this matrix the bismuth cations work as fluorescent sources. A stable transparent glass-ceramic can be formed from this stable glass matrix.

To generate an infrared light emission and optical amplification more readily, it is preferable that the glass composition of the present invention include at least one or two kinds of divalent metal oxides selected from a magnesium oxide (MgO), a calcium oxide (CaO), a strontium oxide (SrO), a barium oxide (BaO) and a zinc oxide (ZnO). It is more preferable that the glass composition further include $Li_2O$ as well.

The glass composition of the present invention can emit infrared light in a wide wavelength range of 1000 nm to 1600 nm and exhibit a high intensity of light emission and a long lifetime of fluorescence. These characteristics are appropriate for amplifying a signal light and a laser emission.

It is preferable that the glass composition of the present invention have an optical absorption peak in the light transmission spectrum in at least one range of 450 nm to 550 nm and 650 nm to 750 nm. When the ratio of the optical absorption coefficient at a peak of 450 nm to 550 nm to that at the base line of the peak in a light absorption spectrum is 0.1 or more, the glass composition can exhibit light excitation more readily.

In the following description on the specific embodiments of the present invention, light transmission spectra, fluorescence spectra that provide the basis for optical amplification and fluorescence lifetimes as well as optical amplification characteristics and fluorescence characteristics are measured. Other basic characteristics including a refractive coefficient, a linear thermal expansion coefficient, a glass transition point and a deformation point also are measured.

Light Transmission/Absorption Spectrum

A glass sample was cut out and then was polished to have mirror-finished surfaces and to be a flat sheet with a size of 20 mm×30 mm×3 mm (thickness) whose respective opposing surfaces were in parallel with each other. Thus a sheet sample was produced. The light transmission spectrum of this sheet sample was measured in the wavelength range of 290 nm to 2500 nm using a commercial spectrophotometer. Whether the optical absorption peak appeared in the respective wavelength ranges of 400 nm to 550 nm and 650 nm to 750 nm in the light transmission spectrum also was checked.

Then, the light transmission spectrum was converted into the molar optical absorption coefficient. The optical absorption coefficient was obtained when 1% of $Bi_2O_3$ is contained and the optical path has a length of 1 cm with the bismuth oxide indicated in terms of $Bi_2O_3$. Thus a light absorption spectrum was prepared. A common tangent to tails of both sides of a peak in this light absorption spectrum was drawn, which was used as a base line. A top line then was drawn so as to be in parallel with the base line and be tangential to the peak. Further, a middle line was drawn that equally divided the distance between the top line and the base line and that was in parallel with those lines. The difference in wavelength between two intersections of the middle line and the spectrum was taken as the half-height width.

Fluorescence Spectrum

With a sheet sample identical to that used in the above, the fluorescence spectrum was measured with a commercial fluorescence spectrophotometer. With respect to each excitation light having a predetermined wavelength of 500 nm, 700 nm or 833 nm, the measurement was carried out in the fluorescence wavelength range of 800 nm to 1600 nm. The sample had a temperature equal to room temperature during the measurement.

The following were determined: the wavelength at which the fluorescence peak appeared in the fluorescence spectrum measured above; a half-height width of fluorescence in which the emission intensity was at least half the peak value; and the emission intensity at the wavelength at which the fluorescence peak appeared. The emission intensity is indicated with an arbitrary unit. However, since the sample shape and the position where the sample is placed during the measurement are not changed, a comparison in emission intensity can be made. The half-height width of fluorescence was determined by the same method as that used for determining the half-height width of the optical absorption peak.

Lifetime of Fluorescence

With a sheet sample identical to that used above, the lifetime of fluorescence also was measured with a fluorescence spectrophotometer. The fluorescence decay caused with the passage of time through excitation carried out with pulsed light having a predetermined wavelength was measured. This measurement was carried out at a predetermined wavelength according to the excitation wavelength, for instance, at 1140 nm when the excitation wavelength was 500 nm. A decay curve thus obtained was subjected to exponential fitting and thus the lifetime of fluorescence was determined.

Optical Amplification Characteristics

The optical amplification characteristics were determined using the measuring apparatus shown in FIG. 1. The wavelength of excitation light as an energy source for amplifying light was 532 nm while two wavelengths of 1064 nm and 1314 nm were employed as the wavelength of signal light to be amplified. In this apparatus, the excitation light and the signal light are superposed spatially on each other in the glass sample and thereby the signal light transmitted through the glass sample is amplified.

A Nd-YAG green laser to be excited with a semiconductor laser (LD) was used for a light source 26 of excitation light 20 with a wavelength of 532 nm and continuous light emitted therefrom was used as the excitation light 20. The excitation light 20 was focused through a convex lens 52 whose focal length was 300 mm. The position of the lens 52 was adjusted, for example, so that the focal point 62 falls on the midpoint of a glass sample 10 in the direction of its thickness.

On the other hand, when signal light 30 with a wavelength of 1064 nm was used, a Nd-YAG laser to be excited with a semiconductor laser 36 other than the excitation light source 26 was employed as a light source and the signal light 30 was pulsed light with a pulse width ns. When the signal light 30 with a wavelength of 1314 nm was used, it was continuous light emitted from a semiconductor laser 36 with that wavelength. The signal light 30 was allowed to enter the glass sample 10 from the direction opposite to that from which the excitation light 20 entered it. The signal light 30 was focused through a convex lens 54 whose focal length was 500 mm or 1000 mm. The position of the lens 54 was adjusted so that the focal point 62 falls on the midpoint of the glass sample 10 in the direction of its thickness. The combination of the focal length of the lens 52 and that of the lens 54 was selected so that the area through which the signal light beam passed was included well in the area through which the excitation light beam passed.

The signal light 30 and the excitation light 20 were multiplexed/demultiplexed with wavelength selective reflectors 72 and 74. These reflectors 72 and 74 were configured so as to transmit the excitation light 20 but reflect the signal light 30.

When the wavelength of the signal light was 1064 nm, a commercially available transparent glass sheet was used as the reflector for the signal light. A transparent glass sheet causes a reflection of several % at its surface. The signal light 30 with a wavelength of 1064 nm emitted from the light source (Nd-YAG laser) 36 is reflected partly by the reflector 74 and the rest enters the glass sample 10. The signal light 32 that has passed through it, i.e. the signal light 32 that has been amplified, is reflected partly by the reflector 72 to be led to a photodetection system 80 through a lens 56.

The two reflectors 72 and 74 do not have high reflectance with respect to light with a wavelength of 1064 nm. The signal light 30, however, is pulsed light and therefore has a very large peak value (a megawatt level at the point from which a laser is emitted). Accordingly, the measurement thereof is easy. The excitation light 20 passes through the reflector 72 with almost no loss to reach the glass sample 10. The excitation light 22 that has not contributed to the optical amplification in the glass sample reaches the reflector 74. However, since a small quantity of light is reflected by that reflector, no harmful effect is imposed on the signal light source 36.

Figure 2:
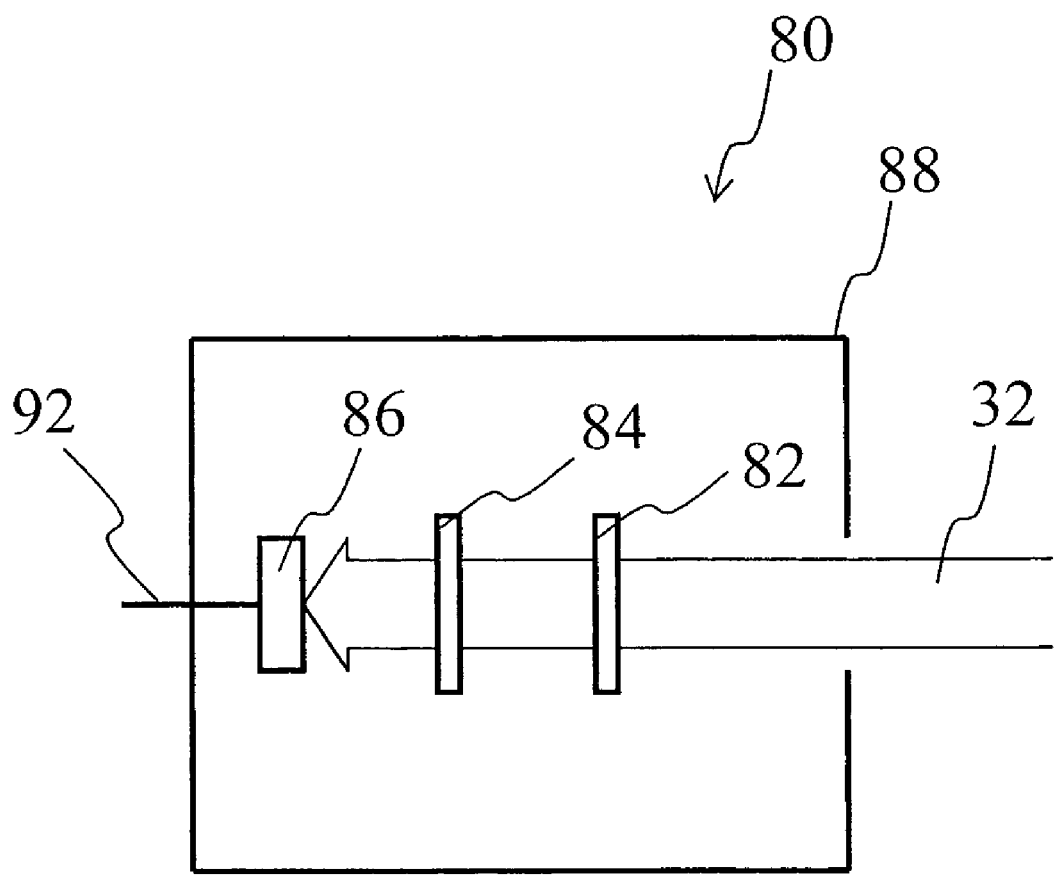
FIG. 2 is a diagram showing a system for detecting light in the 1100-nm range, which is included in the optical system for evaluating optical amplification characteristics.

The photodetection system 80 that is used when the signal light has a wavelength of 1064 nm is shown in detail in FIG. 2. The signal light 32 led to the photodetection system 80 covered with a shielding cover 88 passes through a visible-light cut-off filter 82 and then passes through an interference filter 84 that allows only light with a wavelength of 1064 nm to transmit therethrough to remove light components other than the signal light component. The signal light is converted in a photodetector 86 into an electric signal that corresponds to the light signal intensity and then is displayed on an oscilloscope 90 through a signal cable 92. The photodetector 86 to be used herein may be, for instance, a Si based photodiode.

When the signal light with a wavelength of 1314 nm was used, dielectric multilayer mirrors with a high reflectance with respect to the wavelength 1314 nm were used as the reflectors 72 and 74. The signal light 30 emitted from the signal light source (LD) 36 with a wavelength of 1314 nm is reflected by the reflector 74 to enter the glass sample 10. The signal light 32 that has been amplified is reflected by the reflector 72 to be led to the photodetection system 80. The excitation light 20 passes through the reflector 72 with almost no losses to reach the glass sample 10. The excitation light 22 that has not contributed to the optical amplification reaches the reflector 74 to be reflected slightly. In order to prevent that reflected light from entering the signal light source 36, a dielectric multilayer mirror (not shown in the figure) was inserted that was configured to have a high reflectance with respect to a wavelength of 532 nm.

Figure 3:
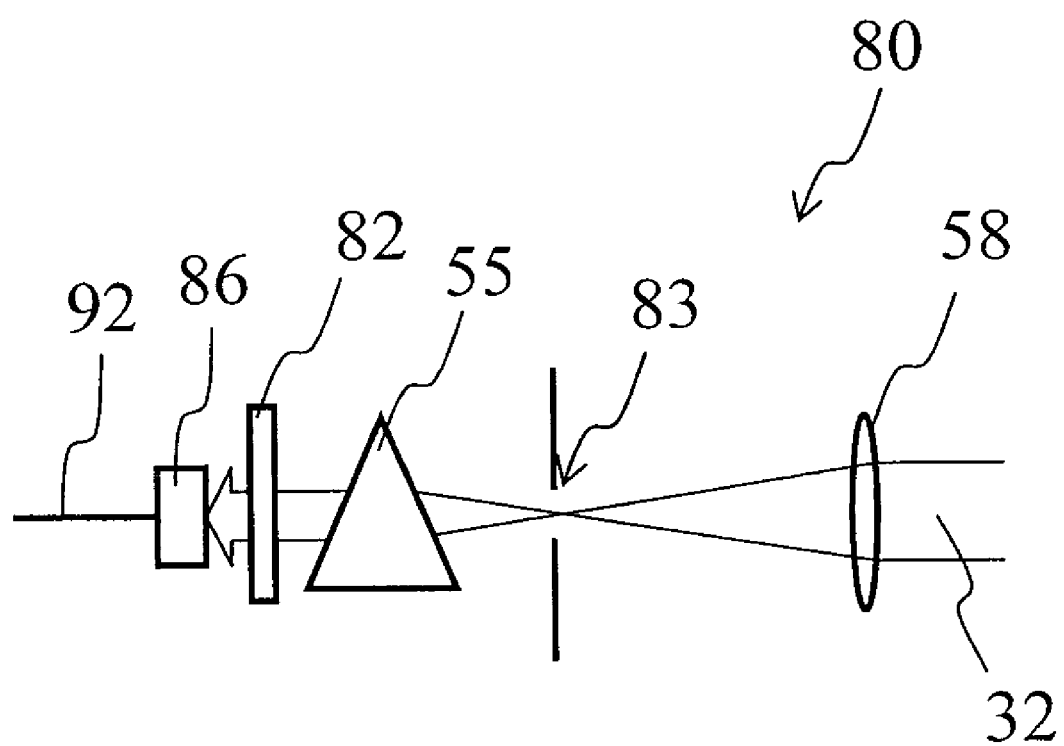
FIG. 3 is a diagram showing a system for detecting light in the 1300-nm range, which is included in the optical system for evaluating optical amplification characteristics.

The photodetection system 80 to be employed when the signal light has a wavelength of 1314 nm is shown in detail in FIG. 3. The signal light 32 led to the photodetection system 80 is focused on a point near a pinhole 83 through a lens 58 having a long focal length (for instance, 1000 mm). When the signal light 32 is allowed to pass through the pinhole, its components that travel in directions other than that in which the signal light should travel, i.e. amplified spontaneous emission (ASE) light and scattered light components can be removed. Furthermore, when the signal light 32 is allowed to pass through a prism 55, an excitation light component with a wavelength of 532 nm is removed and thereby the signal light component alone enters the photodetector 86. The light signal is converted into an electric signal that corresponds thereto and then is displayed on the oscilloscope through the signal cable 92. The photodetector 86 to be used herein can be, for instance, a Ge photodiode.

In the optical system shown in FIG. 1, the excitation light 20 and the signal light 30 travel in the directions opposite to each other. However, the directions in which they travel are not limited thereto. For instance, both the lights may travel in the same direction.

The glass sample need not be of a block-like shape but instead may be a fiber-like shape.

The optical amplification carried out using the above-mentioned optical system was measured as follows.

A glass sample 10 was polished to have mirror-finished surfaces that were in parallel with each other. Thus a block sample was produced. The thickness of the glass sample was determined so that the glass sample had a transmittance of about 95% with respect to the wavelength of excitation light, for instance, a wavelength of 523 nm. This glass sample was set in the position shown in FIG. 1 and some adjustments were made so as to allow the signal light 30 and the excitation light 20 to be superposed well on each other inside the glass sample 10.

Thereafter, the glass sample 10 was irradiated with the signal light 30 and then the intensity of the signal light 32 that had passed through the glass sample 10 was measured with the oscilloscope 90. Subsequently, the glass sample 10 was irradiated with the excitation light 20 while the irradiation of the signal light 30 was continued, and then the intensity of the signal light 32 was measured with the oscilloscope 90 in the same manner as above. The optical amplification phenomenon can be checked through a comparison that is made between the intensity of the signal light transmitted during the irradiation of the signal light alone and that of the signal light transmitted during the simultaneous irradiation of the signal light and the excitation light.

Optical Fiber Amplification Test

Figure 9:
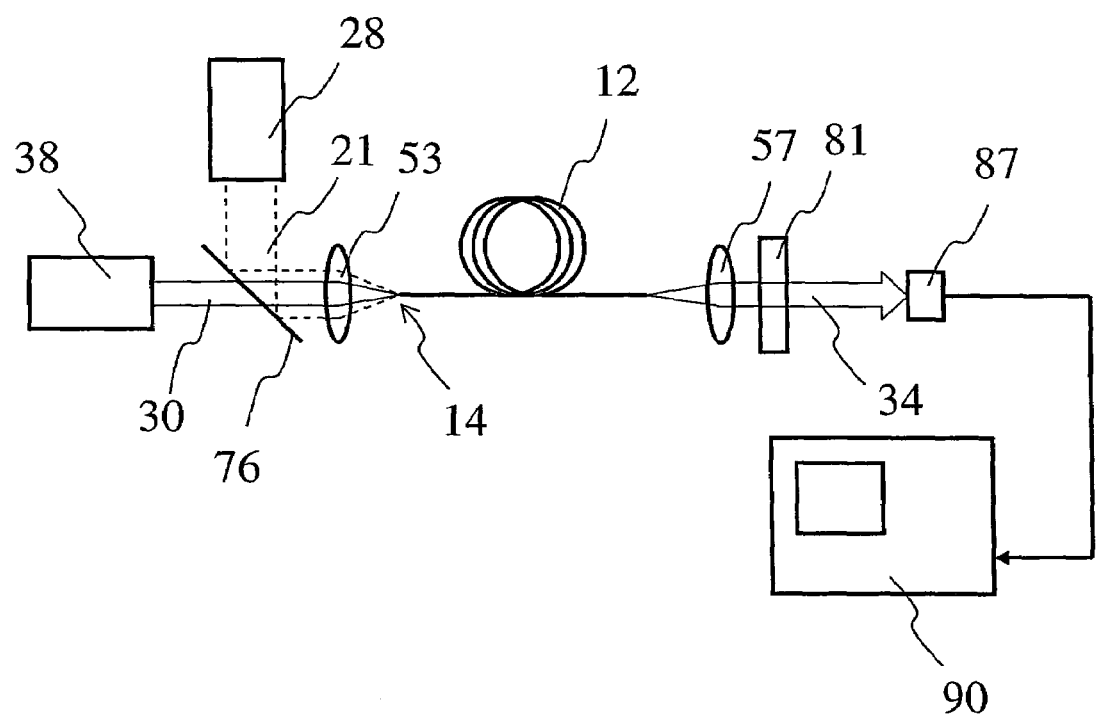
FIG. 9 is a diagram showing another example of light amplifier according to the present invention that was used as an optical system for evaluating optical amplification characteristics of optical fibers.

With respect to the optical amplification characteristics of an optical fiber sample can be determined using the measuring apparatus shown in FIG. 9. The wavelength of excitation light 21 to serve as an energy source for amplifying light is 808 nm while the wavelength of signal light 30 to be amplified is 1314 nm. In this apparatus, the excitation light 21 and the signal light 30 are superposed spatially on each other in the vicinity of an optical fiber end 14 that is a part from which light enters the core of the fiber sample. Thus the signal light 34 that has passed through the fiber sample 12 is amplified.

Continuous light emitted from a semiconductor laser is used for each of light sources 28 and 38 for the excitation light with a wavelength of 808 nm and the signal light with a wavelength of 1314 nm.

The signal light and the excitation light are multiplexed/demultiplexed using a wavelength selection reflector 76. This reflector 76 is configured so as to transmit the signal light 30 but reflect the excitation light 21.

The light that has come out from the optical fiber 12 is led to a photodetector 87 through a lens 57. A filter 81 that transmits the signal light but intercepts the excitation light is inserted in a place on the optical path. This allows only the signal light to be detected by the photodetector.

In the optical system shown in FIG. 9, the excitation light and the signal light travel in the same direction, which however is not limited thereto. For instance, they may travel in the directions opposite to each other. The wavelength selection reflector may reflect the signal light but transmit the excitation light. Furthermore, the signal light and the excitation light may be allowed to enter the optical fiber with a means other than the reflector.

The optical amplification carried out using the above-mentioned optical system can be measured as follows. The optical fiber sample is cut out to have sections that are specular surfaces. This is set in the above-mentioned measuring apparatus. Some adjustments then are made so as to allow the signal light and the excitation light to enter the core of the optical fiber well.

Thereafter, the end 14 of the optical fiber sample 12 is irradiated with the signal light 30 and then the intensity of the signal light 34 that has passed through the optical fiber sample 12 is measured with the oscilloscope 90. Subsequently, the optical fiber sample 12 is irradiated with the excitation light 21 while the irradiation of the signal light 30 is continued, and then the intensity of the signal light 34 is measured with the oscilloscope 90. The optical amplification phenomenon can be checked through a comparison that is made between the intensity of the signal light transmitted during the irradiation of the signal light alone and that of the signal light transmitted during the simultaneous irradiation of the signal light and the excitation light.

The apparatuses shown in FIGS. 1 and 9, particularly the apparatus shown in FIG. 9, are an example of evaluation apparatus as well as a configuration example of a light amplifier according to the present invention. As shown in the figures, the light amplifier includes light sources of excitation light and signal light in addition to a glass composition of the present invention. The configuration of the light amplifier is not limited to those shown in the figures. For instance, a signal-input optical fiber and a signal-output optical fiber may be disposed instead of the light source of the signal light and the photodetector, respectively. In addition, the excitation light and the signal light may be multiplexed/demultiplexed using a fiber coupler. The use of such a light amplifier makes it possible to carry out a signal light amplification method in which excitation light and signal light are allowed to enter a glass composition of the present invention and thereby the signal light is amplified.

Hereinafter, the present invention is described further in detail using examples and comparative examples.

EXAMPLE 1 to 23

Commercially available silica, alumina, lithium carbonate, sodium carbonate, potassium carbonate, magnesium oxide, calcium carbonate, strontium carbonate, barium carbonate, titania, zirconia, boron oxide, bismuth trioxide ($Bi_2O_3$), etc were weighed so that the respective compositions indicated in Tables 1A and 2A were obtained. Thus raw material batches were prepared.

For the purposes of preventing bismuth trioxide from being reduced unnecessarily and refining glass, magnesium sulfate ($MgSO_4$) that was a commercially available reagent was used as a part of the MgO raw material. In the composition containing $Na_2O$, sodium sulfate ($Na_2SO_4$) was used as a part of the $Na_2O$ raw material. The content of such sulfates was determined so that the mole ratio thereof to bismuth trioxide was at least 1/20.

Each batch thus prepared was put into a platinum crucible and was kept in an electric furnace at 1600° C. for 18 hours. Thereafter, the molten batch was poured on an iron plate to be cooled. The glass melt that had been poured thereon was solidified in about ten seconds. After this glass was kept in an electric furnace at 800° C. for 30 minutes, the power of the furnace was turned off and the glass then was cooled slowly to room temperature to obtain respective glass samples.

The characteristics of the glass samples including a color tone, a light transmission spectrum, a fluorescence spectrum, a fluorescence lifetime, a refractive index, a linear thermal expansion coefficient, a glass transition point and a deformation point were measured. Tables 1A, 1B, 2A and 2B shows the results.

Figure 4:
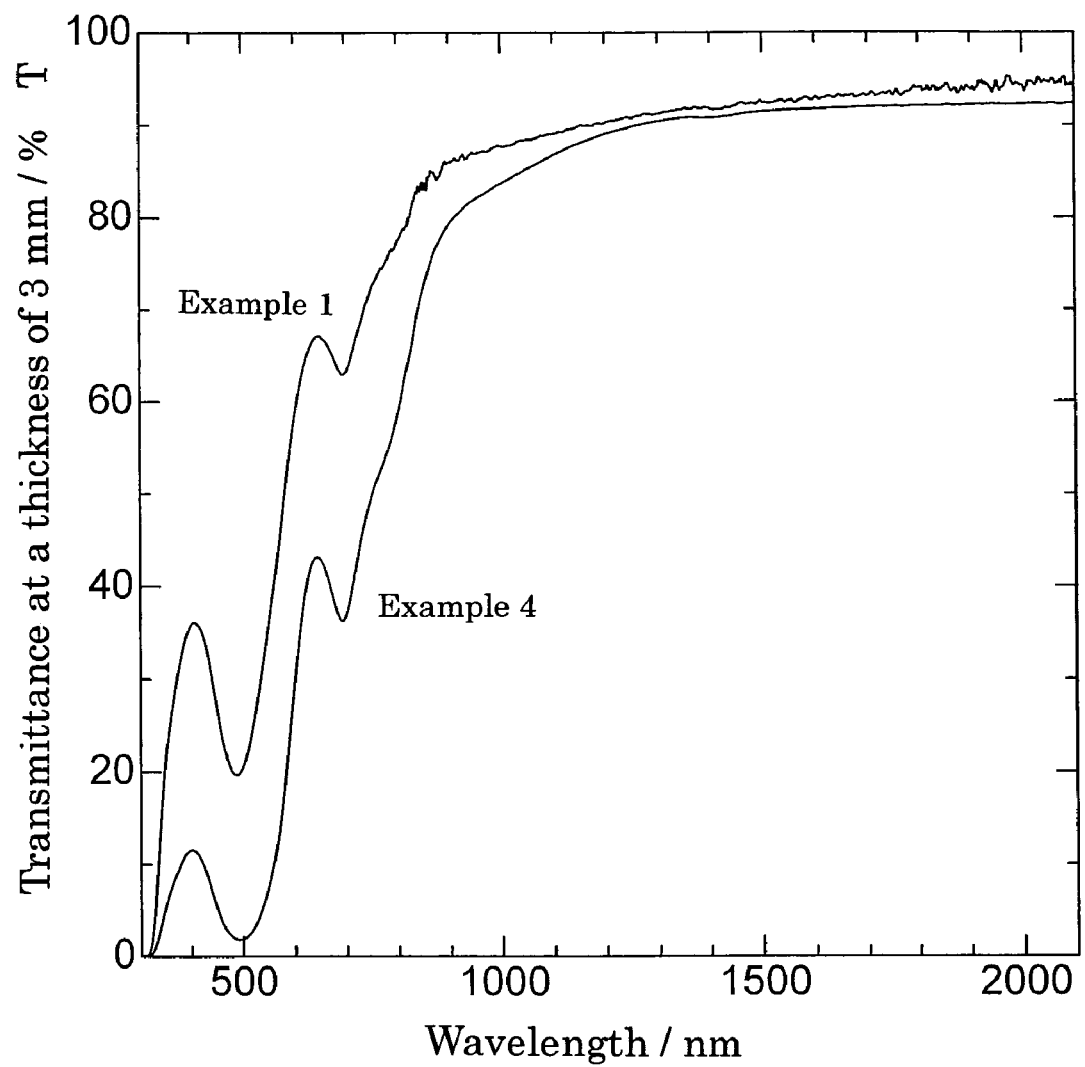
FIG. 4 is a graph showing examples of light transmission spectra of glass compositions according to the present invention.

Visual inspection showed that the glass samples of Sample 1 to 23 were red or reddish brown. The glass samples had optical absorption peaks in wavelength ranges of 450 nm to 550 nm and 650 nm to 750 nm as shown in FIG. 4. FIG. 4 shows the spectra of Examples 1 and 4, and the glass samples of Examples 1 to 23 all had similar spectra.

Figure 5:
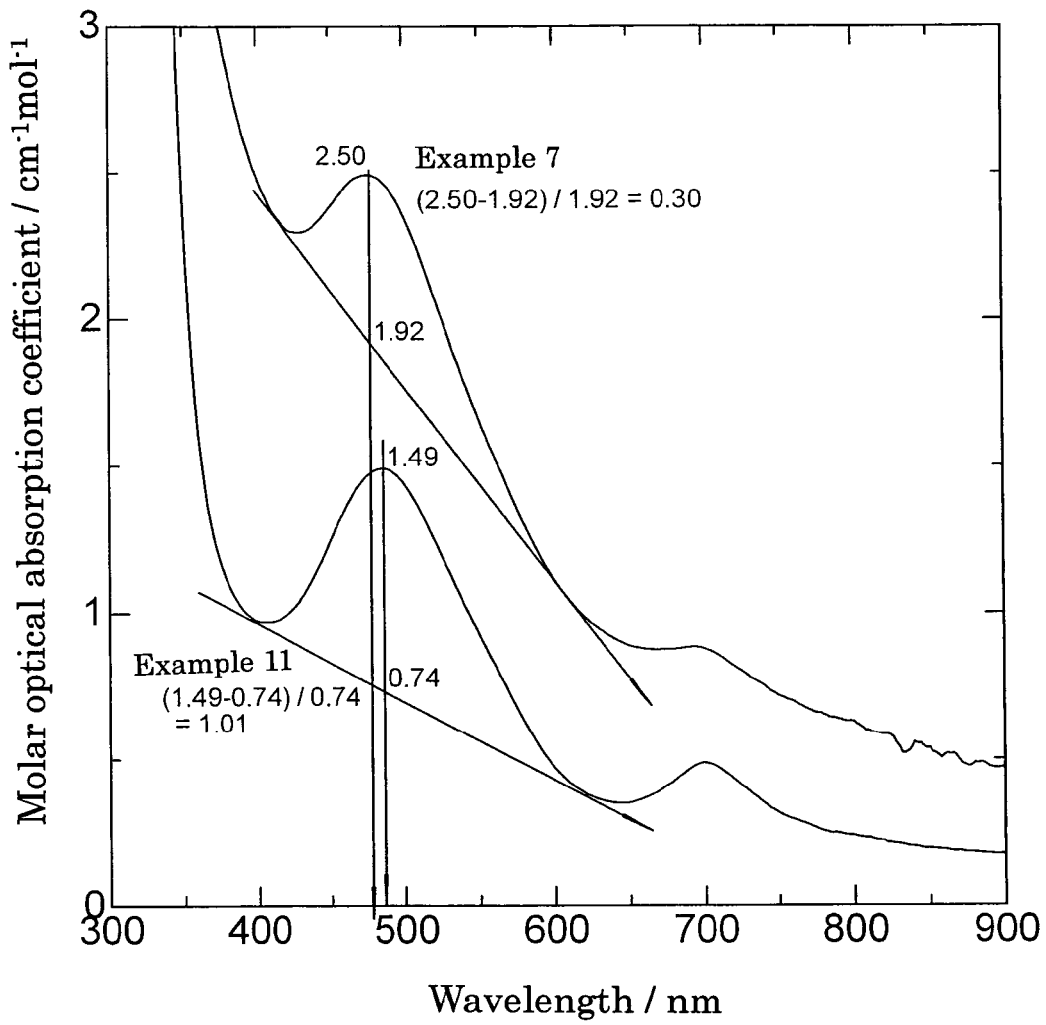
FIG. 5 is a graph showing examples of light absorption spectra of glass compositions according to the present invention.

FIG. 5 shows the examples of the optical absorption peaks calculated from the light transmission spectra. A common tangential line was drawn for the base line and the ratio of the absorption coefficient that forms the peak to the absorption coefficient at the base line was determined. With respect to the optical absorption peaks in a wavelength range of 450 nm to 550 nm, the ratios are more than 0.1. The calculation results from Examples 7 and 11 are shown in FIG. 5 and the glass samples of Examples 1 to 23 all had the ratio of more than 0.1 as shown in Tables 1B and 2B.

Figure 6:
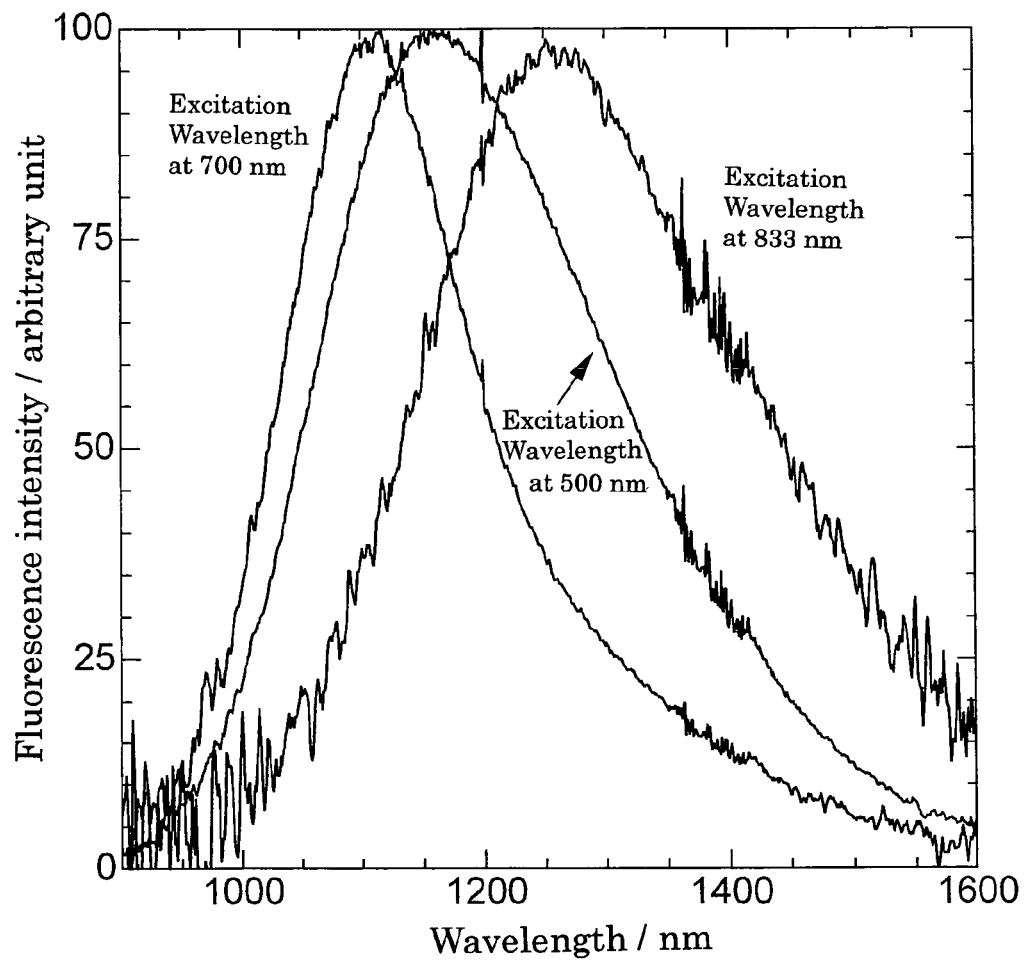
FIG. 6 is a graph showing examples of fluorescence spectra obtained in a glass composition of the present invention.

The glass samples of Examples 1 to 23 all emitted fluorescence in the infrared region as shown in Tables 1B and 2B. FIG. 6 shows the fluorescence spectra from Example 10. The light emission in a wide wavelength range of 1000 nm to 1600 nm was observed when being irradiated with light having a wavelength of 500 nm, 700 nm or 833 nm.

When the glass sample of Example 15 was excited with light having a wavelength of 833 nm, the half-height width of the fluorescence reached 349 nm that was the maximum value in all the Examples. The glass samples all had at least 150 nm of the half-height width, and thus it was confirmed that the glass composition of the present invention had the ability of emitting light in a wide wavelength region.

Tables 1B and 2B show fluorescence lifetimes. In Example 18, the fluorescence lifetime reached 508 μs and those in Examples 1, 3, 4, 7, 9, 10 and 12 to 22 are 200 μs or more, and thus it was confirmed the glass composition of the present invention had the ability of emitting light in the infrared region efficiently.

Figure 7:
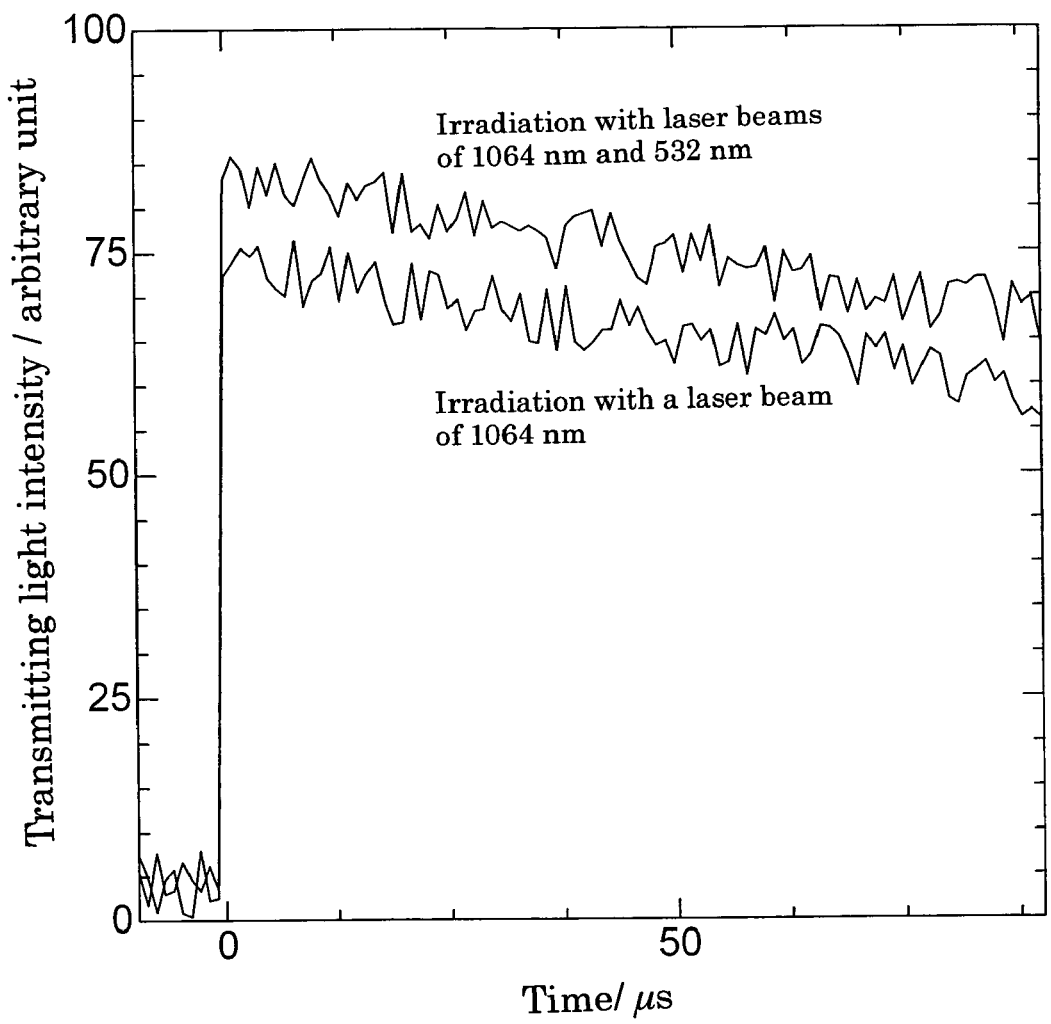
FIG. 7 is a graph showing examples of optical amplification characteristics of a glass composition according to the present invention.

Further, the optical amplification characteristics were measured. FIG. 7 shows the transmission light intensities of the glass sample of Example 10. The transmission light intensity that was observed with the irradiation of a signal light having a wavelength of 1064 nm and a laser light having a wavelength of 532 nm was clearly higher than the transmission light intensity that was observed with the irradiation of the signal light only, and thus it was confirmed the glass composition of the present invention had the ability of amplifying a signal light.

Figure 8:
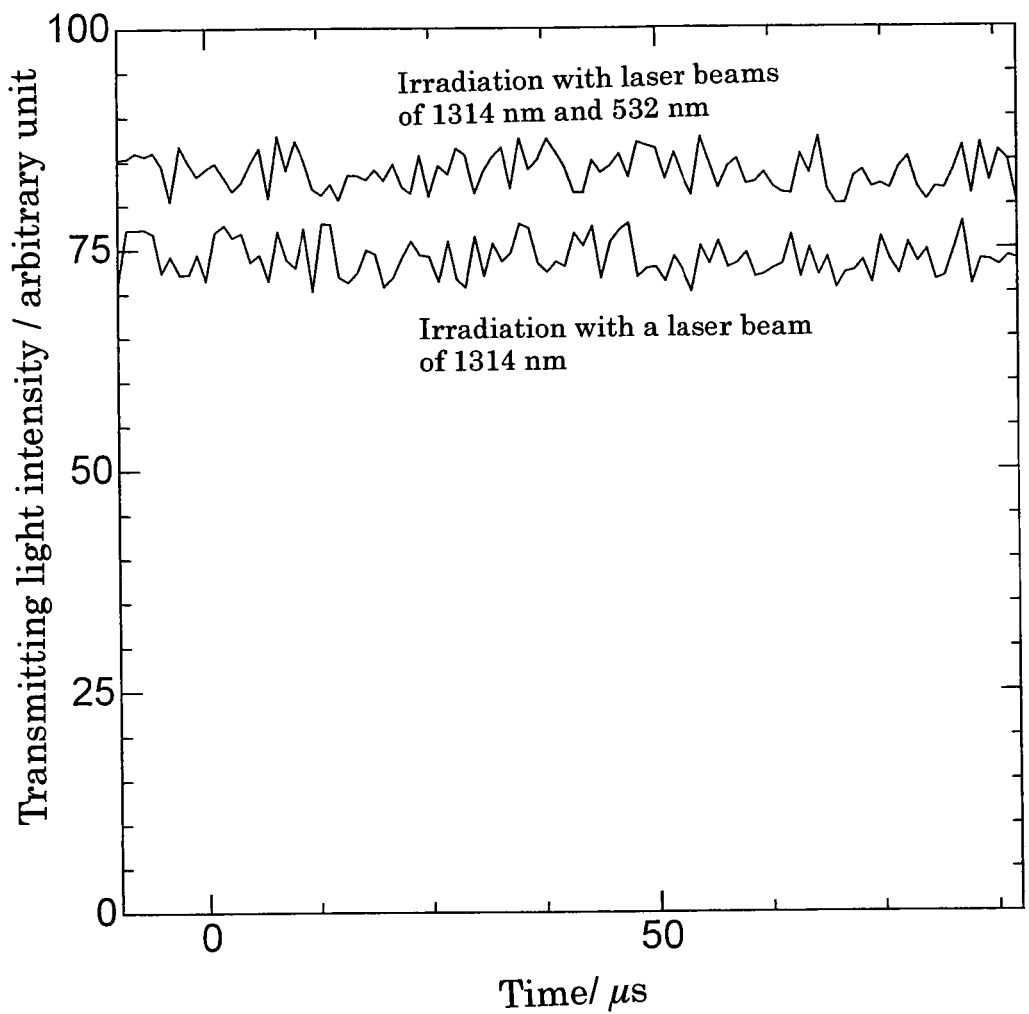
FIG. 8 is a graph showing other examples of optical amplification characteristics of a glass composition according to the present invention.

FIG. 8 shows the results of the experiment in which the wavelength of the signal light is 1314 nm instead of 1064 nm. The transmission light intensity that was observed with the irradiation of the signal light having a wavelength of 1314 nm and the laser light having a wavelength of 532 nm was clearly higher than the transmission light intensity that was observed with the irradiation of the signal light only, and thus it was confirmed that the glass composition of the present invention could amplify a signal light having a wavelength of 1314 nm as well.

This peak wavelength of the emitted light from this glass sample was about 1140 nm and the light intensity at 1064 nm was the same as that at about 1350 nm. This means that optical amplification can be conducted in a wide range of 250 nm or more in wavelength width selected in a wavelength range of 1064 nm to 1350 nm. The similar results were obtained from the other glass samples.

EXAMPLE 24

Example 24 shows an example of the glass-ceramics. The glass sample of Example 11 was kept in an electric furnace at 780° C. for one hour. Then, the temperature in the furnace was raised at a rate of 5° C./min. to 850° C. and kept for one hour, and the power of the furnace was turned off and the glass then was cooled slowly to room temperature to obtain the glass sample of Example 24.

Even after the heat treatment, the glass sample was not deformed and the color tone of the glass sample hardly changed. On the other hand, the thermal expansion coefficient line for measuring a glass transition point and a deformation point had no inflection points and no maximum values in room temperature to 1000° C. This means that the glass-ceramics sample was obtained through the heat treatment and that the heat resistance of the glass-ceramics is sufficient.

The characteristics of the glass-ceramics sample were measured by the above-described methods and Table 2B shows the results. The sample had optical absorption peaks in wavelength ranges of 450 nm to 550 nm and 650 nm to 750 nm. The sample emitted light in a wide wavelength range of 1000 nm to 1600 nm when being irradiated with light having a wavelength of 500 nm, 700 nm or 833 nm and a long fluorescence lifetime of 203 μs was observed.

COMPARATIVE EXAMPLES 1 to 4

The raw materials that were weighed so that the respective compositions indicated in Table 3 were obtained, and the glass samples were formed by the same method as in the Examples. However, in Comparative Example 4, the batch prepared was put into a platinum crucible and was kept in an electric furnace at 1450° C. for four hours. Thereafter, the molten batch was poured on an iron plate to be cooled. After the glass obtained was kept an electric furnace at 550° C. for 30 minutes, the power of the furnace was turned off and the glass then was cooled slowly to room temperature to obtain the glass sample.

The characteristics of the glass samples including a color tone, a light transmission spectrum and a fluorescence spectrum were measured by the methods as in Examples and Table 3 shows the results.

In Comparative Examples 1 and 2, the solidified substances obtained as the samples had no gloss at their surfaces and had devitrified completely to the inside thereof. In Comparative 3, the glass sample exhibited a dark brown color and had no optical absorption peaks in the light transmission spectrum and did not emit light in the infrared region when being irradiated with light having a wavelength of 400 nm to 850 nm. The glass sample of Comparative Example 4 had a common soda-lime glass composition. It was transparent and colorless and had no optical absorption peak in the light transmission spectrum and did not emit light in the infrared region when being irradiated with light having a wavelength of 400 nm to 850 nm.

Hereinafter, the reasons for the limitations on compositions are described with reference to the results of Examples and Comparative Examples.

Bismuth oxide is a component for allowing a glass composition of the present invention to emit or amplify light. A preferable bismuth oxide is a bismuth trioxide ($Bi_2O_3$) or a bismuth pentoxide ($Bi_2O_5$). When the content of bismuth oxide in terms of $Bi_2O_3$ is less than 0.01 mol %, the intensity of fluorescence in the infrared region that is provided by bismuth oxide is insufficient. The content of bismuth oxide is preferably 0.1 mol % or more.

On the other hand, when the content of bismuth oxide is more than 5 mol %, the optical absorption peak tends not to appear in the wavelength range of 450 nm to 550 nm in the light transmission spectrum and the infrared light emission derived from the peak cannot be obtained. Therefore, the content of bismuth oxide in terms of $Bi_2O_3$ is preferably 0.01 to 5 mol %, more preferably 0.01 to 3 mol %, and particularly preferably 0.1 to 3 mol %.

When a part of bismuth oxide is reduced during melting a raw material batch, the glass obtained cannot emit fluorescence in the infrared region and exhibits a dark brown or black color. Platinum or platinum based alloy melting vessels such as a platinum crucible might be eroded with the reduction of bismuth oxide. Accordingly, it is advantageous that a salt with high oxidizability such as a metal sulfate or a metal nitrate is added as a part of the raw material A preferable amount of the metal sulfate and nitrate that is expressed in a mole ratio is at least 1/20 of bismuth oxide.

$SiO_2$ is a component for forming a glass network. An increase in content of $SiO_2$ results in an increase in emission intensity of the glass composition or the glass-ceramics but results in an increase in viscosity of a glass melt at the same time. On the other hand, an excessive decrease in the content of $SiO_2$ results in a decrease in emission intensity of the glass composition or the glass ceramics in the infrared region and furthermore, allows them to tend to devitrify. Accordingly, the content of $SiO_2$ is preferably 55 to 80 mol %, more preferably 60 to 75 mol %.

$Al_2O_3$ is a component for allowing bismuth oxide to emit infrared light in the glass composition or the glass-ceramics. When the content thereof is excessively low, this effect is not exhibited. The content of $Al_2O_3$ is preferably at least 5 mol %. The emission intensity of the glass composition increases with an increase in content of $Al_2O_3$. However, when the content thereof exceeds 25 mol %, the raw material batches deteriorate in solubility and become difficult to be melt. Further the glass composition tends to devitrify even if the batches have been melted completely. Accordingly, the content of $Al_2O_3$ is preferably 5 to 25 mol %, further preferably 5 to 20 mol %, more preferably 10 to 20 mol %.

A divalent metal oxide RO (RO=MgO+CaO+SrO+BaO+ZnO) is a component for increasing the solubility of the glass composition. The glass composition free from RO increases the viscosity of the glass melt excessively and deteriorates the uniformity of the glass composition and the solubility of the raw material batch. The content of RO is preferably at least 0.1 mol %.

The uniformity of the glass composition easily can be maintained with an increase in content of RO. However, when the content thereof exceeds 40 mol %, the glass composition exhibits dark brown and loses an optical absorption peak in a wavelength region of 450 nm to 550 nm and the emission of infrared light, and further tends to devitrify during cooling a glass melt. Accordingly, the content of RO is preferably 0.1 to 40 mol %, further preferably 0.1 to 35 mol %, more preferably 0.2 to 30 mol %.

It is advantageous that a raw material with high oxidizability such as a sulfate ($RSO_4$) or a nitrate ($R(NO_3)_2$) is used as a part of the raw material for RO. The salt generates a compound with high oxidizability and the compound prevents a bismuth oxide from being reduce. These salts may work as a refining agent in a glass melt.

MgO is a glass network modifier. MgO improves meltability of a raw material batch. However, an excessively high content of MgO causes a glass composition to exhibit a dark brown color, the optical absorption peak in the wavelength range of 450 nm to 550 nm to decrease, and accordingly the emission intensity to decrease rapidly. An excessively high content of MgO results in excessively low viscosity of a glass melt, which causes devitrification readily. The content of MgO is preferably 0 to 40 mol %, further preferably 0.1 to 35 mol %, more preferably 0.1 to 30 mol %.

Like MgO, CaO improves the meltability of a raw material batch and is superior to MgO in characteristic of improving the devitrification resistance of glass. As in the case of MgO, however, when the content of CaO is excessively high, glass exhibits a dark brown color and thereby has a decreased emission intensity. Accordingly, the content of CaO is preferably 0 to 30 mol %, further preferably 0 to 20 mol %, more preferably 0 to 18 mol %, and particularly preferably 0 to 10 mol %.

Like MgO and CaO, SrO also improves the meltability of a raw material batch. Even a small amount (for instance, 0.1 mol % or more) of SrO improves the devitrification resistance of glass considerably. SrO, however, has a strong effect of rapidly decreasing the intensity of fluorescence that is provided by bismuth. Accordingly, the content of SrO is preferably 0 to 5 mol %.

Like MgO and CaO, BaO also improves the meltability of a raw material batch. BaO has a higher effect of improving the refractive index as compared to other divalent metal oxides. Since the increase in refractive index results in improvement in luster of a glass surface, the development of red or reddish brown also is improved. Hence, it is advantageous that for instance, at least 0.1 mol % of BaO is added. BaO, however, has a strong effect of rapidly decreasing emission intensity. Accordingly, the content of BaO is preferably 0 to 5 mol %.

ZnO also improves the meltability of a raw material batch. ZnO has a greater effect of allowing the color of glass to develop into red or reddish brown as compared to CaO, SrO, and BaO. ZnO also is excellent in the effect of increasing the refractive index of glass as compared to MgO. With consideration given to this, a small amount (for instance, 0.1% or more) of ZnO may be added. As in the case of MgO, however, when the content of ZnO is excessively high, glass exhibits a dark brown color and thereby has a decreased emission intensity. When the content of ZnO is excessively high, glass may suffer phase separation to become cloudy and thereby transparent glass may not be obtained. Accordingly, the content of ZnO is preferably 0 to 25 mol %, further preferably 0.1 to 20 mol %, and more preferably 0.1 to 18 mol %.

$Li_2O$ is a glass network modifier. $Li_2O$ decreases melting temperature to improve meltability and also improves the refractive index of glass. An addition of a suitable amount of $Li_2O$ improves optical absorption to increase the emission intensity. It therefore is advantageous to add at least 0.1 mol % of $Li_2O$. As in the case of MgO, however, when the content of $Li_2O$ is excessively high, glass exhibits a dark brown color and thereby has a decreased emission intensity. A still higher content of $Li_2O$ results in decreased viscosity of a glass melt and thereby devitrification tends to occur. The content of $Li_2O$ is 0 to 15 mol %, more preferably 0 to 12 mol %.

$Na_2O$ lowers the melting temperature as well as the liquidus temperature and thereby prevents glass from devitrifying. $Na_2O$, however, has a strong effect of weakening fluorescence by making glass dark brown. Accordingly, the content of $Na_2O$ is preferably 0 to 5 mol %, more preferably 0 to 2 mol %.

$K_2O$ lowers the liquidus temperature and thereby prevents glass from devitrifying. $K_2O$, however, weakens fluorescence of glass in the infrared region even when a small amount thereof is added. Accordingly, the content of $K_2O$ is preferably 0 to 5 mol %, more preferably 0 to 2 mol %.

It is advantageous that a raw material with high oxidizability such as a sulfate ($M_2SO_4$) or a nitrate ($MNO_3$) is used as a part of the raw material for alkali metal oxides of $Li_2O$, $Na_2O$ and $K_2O$. The salt generates a compound with high oxidizability and the compound prevents a bismuth oxide from being reduced. The salt may work as a refining agent. In particular, the sulfate is decomposed in an early stage of a batch melting process and accelerates melting of $SiO_2$ to enhance the solubility of the glass composition.

$TiO_2$ increases the refractive index of glass and promotes fluorescence. BaO has a strong effect of decreasing the emission intensity while $TiO_2$ has an effect of improving the emission intensity. $TiO_2$, however, has an effect of making glass cloudy. Accordingly, the content of $TiO_2$ is preferably 0 to 10 mol %, more preferably 0 to 5 mol %.

Like $TiO_2$, $ZrO_2$ improves the refractive index of glass and promotes infrared fluorescence. $ZrO_2$, however, has an effect of accelerating crystallization of glass and increasing the density of glass. Accordingly, in order to prevent the devitrification from occurring and the density from increasing, the content of $ZrO_2$ is preferably 0 to 5 mol %, more preferably 0 to 3 mol %.

$B_2O_3$ is an optional component to decrease the viscosity of a glass melt and to increase the uniformity of the glass composition, and this advantageous effect is remarkable when the glass composition includes a high content of $SiO_2$ or $Al_2O_3$. However, an excessively high content of $B_2O_3$ tends to cause a phase separation and opacification. The content of $B_2O_3$ is preferably 0 to 10 mol %.

Furthermore, for the purposes of, for instance, controlling the refractive index, controlling temperature viscosity characteristics, and inhibiting devitrification, the glass compositions of the present invention may contain $Y_2O_3$, $La_2O_3$, $Ta_2O_5$, $Nb_2O_5$, $GeO_2$ and $In_2O_3$, preferably with the total content thereof being 5 mol % or less, in addition to the above-mentioned components.

Moreover, for the purposes of, for instance, allowing glass to be clear when it is melted and preventing bismuth from being reduced, the glass composition of the present invention may include $As_2O_3$, $Sb_2O_3$, $SO_3$, $SnO_2$, $Fe_2O_3$, Cl and F, preferably with the total content thereof being 1 mol % or less.

Components other than those described above may be introduced, as trace amounts of impurities, into glass raw materials. However, when the total content of such impurities is less than 1 mol %, the effect to be imposed on the physical properties of the glass composition is small and therefore does not cause any substantial problems.

The glass compositions of the present invention can be used in the 1310-nm range, one of the wavelength ranges that are used in optical communications mainly. The present invention can provide a new optical amplification medium that works in the wavelength range of 1100 nm to 1300 nm, for which no suitable optical amplification material has been reported. The glass compositions of the present invention can provide broad fluorescence spectra over 1000 nm to 1400 nm in at least preferable embodiments thereof. The use of them makes it possible to provide light amplifiers that operate in that wide wavelength range. Devitrification of the glass composition can be avoided readily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

TABLE 1A

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Composition (mol %) | $SiO_2$ | 68.3 | 70.3 | 71.3 | 67.8 | 67.7 | 67.7 | 64.4 | 67.9 | 66.3 | 73.2 | 70.6 | 73.3 |
| | $Al_2O_3$ | 14.9 | 13.9 | 14.9 | 15.4 | 15.4 | 15.3 | 13.9 | 10.1 | 12.9 | 14.9 | 13.8 | 14.9 |
| | $Li_2O$ | 5.0 | 8.9 | 8.9 | 0 | 0 | 0 | 5.0 | 0 | 0 | 9.9 | 8.0 | 0 |
| | $Na_2O$ | 0 | 0 | 0 | 0 | 0 | 0 | 0 | 0 | 0 | 0 | 0.9 | 0 |
| | $K_2O$ | 0 | 0 | 0 | 0 | 0 | 0 | 0 | 0.1 | 0 | 0 | 0.3 | 0 |
| | MgO | 9.9 | 3.0 | 3.0 | 15.5 | 0.1 | 3.9 | 14.9 | 1.0 | 14.9 | 0.1 | 0.5 | 9.9 |
| | CaO | 0 | 0 | 0 | 0 | 15.5 | 0 | 0 | 5.8 | 0 | 0 | 0 | 0 |
| | SrO | 0 | 0 | 0 | 0 | 0 | 0 | 0 | 2.1 | 0 | 0 | 0 | 0 |
| | BaO | 0 | 0 | 0 | 0 | 0 | 0 | 0 | 2.8 | 0 | 0 | 1.1 | 0 |
| | $TiO_2$ | 0 | 2.0 | 0 | 0 | 0 | 0 | 0 | 0 | 0 | 0 | 2.3 | 0 |
| | $ZrO_2$ | 1.0 | 1.0 | 1.0 | 0 | 0 | 0 | 1.0 | 0 | 0 | 1.0 | 1.1 | 1.0 |
| | ZnO | 0 | 0 | 0 | 0 | 0 | 11.6 | 0 | 0 | 0 | 0 | 1.1 | 0 |
| | $B_2O_3$ | 0 | 0 | 0 | 0 | 0 | 0 | 0 | 10.0 | 5.0 | 0 | 0 | 0 |

TABLE 1A-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $Bi_2O_3$ | 1.0 | 1.0 | 1.0 | 1.3 | 1.3 | 1.5 | 1.0 | 0.3 | 1.0 | 1.0 | 0.3 | 1.0 |
| RO | 9.9 | 3.0 | 3.0 | 15.5 | 15.6 | 15.5 | 14.9 | 11.6 | 14.9 | 0.1 | 2.7 | 9.9 |
| Color Tone of Glass | Red | Red | Red | Red | Red | Red | RB | RB | Red | Red | Red | Red |

RB = Reddish Brown

TABLE 1B

| | Example | | | | | | | |
|---|---|---|---|---|---|---|---|---|
| | 1 | 2 | 3 | 4 | 5 | 6 | 7 | 8 |
| Presence of Optical Absorption Peak | | | | | | | | |
| 400 nm to 550 nm | Yes | Yes | Yes | Yes | Yes | Yes | Yes | Yes |
| Ratio of Peal to Base | 1.01 | 0.14 | 0.44 | 1.47 | 1.50 | 1.80 | 0.30 | 0.59 |
| 650 nm to 750 nm | Yes | Yes | Yes | Yes | Yes | Yes | Yes | Yes |
| Fluorescence Spectrum Excited at 500 nm | | | | | | | | |
| Peak Wavelength (nm) | 1151 | 1166 | 1164 | 1170 | 1160 | 1130 | 1151 | 1110 |
| Half-Height Width (nm) | 288 | 287 | 289 | 270 | 290 | 230 | 276 | 220 |
| Fluorescence Spectrum Excited at 700 nm | | | | | | | | |
| Peak Wavelength (nm) | 1103 | 1110 | 1108 | 1110 | 1100 | 1100 | 1100 | 1100 |
| Half-Height Width (nm) | 182 | 192 | 190 | 200 | 190 | 170 | 184 | 100 |
| Fluorescence Spectrum Excited at 833 nm | | | | | | | | |
| Peak Wavelength (nm) | 1250 | 1269 | 1262 | 1250 | 1290 | 1250 | 1267 | 1250 |
| Half-Height Width (nm) | 322 | 305 | 329 | 280 | 310 | 310 | 321 | 330 |
| Lifetime of fluorescence (μs) | 299 | — | 271 | 259 | — | — | 214 | — |
| Refractive index | 1.546 | 1.541 | 1.536 | — | — | — | 1.555 | — |
| Abbe's Number | 61 | 68 | 61 | — | — | — | 60 | — |
| Thermal Expansion Coefficient ($10^{-7}$ ° C.) | 38 | 41 | 43 | — | — | — | 42 | — |
| Glass Transition Point (° C.) | 716 | 690 | 680 | — | — | — | 702 | — |
| Deformation Point (° C.) | 759 | 763 | 770 | — | — | — | 772 | — |

| | Example | | | |
|---|---|---|---|---|
| | 9 | 10 | 11 | 12 |
| Presence of Optical Absorption Peak | | | | |
| 400 nm to 550 nm | Yes | Yes | Yes | Yes |
| Ratio of Peal to Base | 0.90 | 1.53 | 1.01 | 1.43 |
| 650 nm to 750 nm | Yes | Yes | Yes | Yes |
| Fluorescence Spectrum Excited at 500 nm | | | | |
| Peak Wavelength (nm) | 1123 | 1163 | 1140 | 1126 |
| Half-Height Width (nm) | 218 | 284 | 250 | 224 |
| Fluorescence Spectrum Excited at 700 nm | | | | |
| Peak Wavelength (nm) | 1097 | 1110 | 1110 | 1095 |
| Half-Height Width (nm) | 172 | 192 | 180 | 172 |
| Fluorescence Spectrum Excited at 833 nm | | | | |
| Peak Wavelength (nm) | 1232 | 1255 | 1260 | 1244 |
| Half-Height Width (nm) | 318 | 320 | 300 | 304 |
| Lifetime of fluorescence (μs) | 348 | 314 | — | 392 |
| Refractive index | 1.537 | 1.524 | — | 1.529 |
| Abbe's Number | 61 | 61 | — | 58 |
| Thermal Expansion Coefficient ($10^{-7}$ ° C.) | 30 | 41 | — | 26 |
| Glass Transition Point (° C.) | 740 | 713 | — | 803 |
| Deformation Point (° C.) | 803 | 772 | — | 862 |

TABLE 2A

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Composition (mol %) | $SiO_2$ | 73.3 | 64.4 | 61.4 | 79.2 | 67.3 | 73.8 | 73.7 | 75.6 | 72.3 | 64.0 | 61.8 | 70.6 |
| | $Al_2O_3$ | 14.9 | 13.9 | 11.9 | 8.9 | 20.8 | 15.0 | 15.0 | 7.6 | 10.8 | 19.2 | 21.9 | 13.8 |
| | $Li_2O$ | 5.0 | 0 | 0 | 5.0 | 5.0 | 10.0 | 10.0 | 5.0 | 5.0 | 5.0 | 5.0 | 8.0 |
| | $Na_2O$ | 0 | 0 | 0 | 0 | 0 | 0 | 0 | 0 | 0 | 0 | 0 | 0.9 |
| | $K_2O$ | 0 | 0 | 0 | 0 | 0 | 0 | 0 | 0 | 0 | 0 | 0 | 0.3 |
| | MgO | 5.0 | 19.8 | 24.8 | 5.0 | 5.0 | 0.1 | 0.1 | 9.9 | 9.9 | 9.9 | 10.0 | 0.5 |
| | CaO | 0 | 0 | 0 | 0 | 0 | 0 | 0 | 0 | 0 | 0 | 0 | 0 |
| | SrO | 0 | 0 | 0 | 0 | 0 | 0 | 0 | 0 | 0 | 0 | 0 | 0 |
| | BaO | 0 | 0 | 0 | 0 | 0 | 0 | 0 | 0 | 0 | 0 | 0 | 1.1 |
| | $TiO_2$ | 0 | 0 | 0 | 0 | 0 | 0 | 0 | 0 | 0 | 0 | 0 | 2.3 |
| | $ZrO_2$ | 1.0 | 1.0 | 1.0 | 1.0 | 1.0 | 1.0 | 1.0 | 1.0 | 1.0 | 1.0 | 1.0 | 1.1 |
| | ZnO | 0 | 0 | 0 | 0 | 0 | 0 | 0 | 0 | 0 | 0 | 0 | 1.1 |
| | $B_2O_3$ | 0 | 0 | 0 | 0 | 0 | 0 | 0 | 0 | 0 | 0 | 0 | 0 |
| | $Bi_2O_3$ | 1.0 | 1.0 | 1.0 | 1.0 | 1.0 | 0.1 | 0.3 | 1.0 | 1.0 | 1.0 | 0.3 | 0.3 |
| | RO | 5.0 | 19.8 | 24.8 | 5.0 | 5.0 | 0.1 | 0.1 | 9.9 | 9.9 | 9.9 | 10.0 | 2.7 |
| Color Tone of Glass | | Red | Red | Red | Red | Red | Red | Red | Red | Red | Red | Red | Red |

TABLE 2B

| | Example | | | | | | | |
|---|---|---|---|---|---|---|---|---|
| | 13 | 14 | 15 | 16 | 17 | 18 | 19 | 20 |
| Presence of Optical Absorption Peak | | | | | | | | |
| 400 nm to 550 nm | Yes | Yes | Yes | Yes | Yes | Yes | Yes | Yes |
| Ratio of Peal to Base | 1.84 | 0.99 | 0.73 | 1.15 | 1.39 | 0.10 | 0.61 | 0.08 |
| 650 nm to 750 nm | Yes | Yes | Yes | Yes | Yes | Yes | Yes | Yes |
| Fluorescence Spectrum Excited at 500 nm | | | | | | | | |
| Peak Wavelength (nm) | 1145 | 1133 | 1143 | 1161 | 1143 | 1113 | 1131 | 1156 |
| Half-Height Width (nm) | 265 | 233 | 243 | 280 | 261 | 187 | 258 | 289 |
| Fluorescence Spectrum Excited at 700 nm | | | | | | | | |
| Peak Wavelength (nm) | 1103 | 1093 | 1195 | 1111 | 1100 | 1102 | 1106 | 1111 |
| Half-Height Width (nm) | 179 | 180 | 187 | 184 | 181 | 157 | 164 | 175 |
| Fluorescence Spectrum Excited at 833 nm | | | | | | | | |
| Peak Wavelength (nm) | 1249 | 1255 | 1265 | 1259 | 1250 | — | 1240 | 1288 |
| Half-Height Width (nm) | 304 | 328 | 349 | 314 | 324 | — | 394 | 364 |
| Lifetime of fluorescence (μs) | 304 | 335 | 258 | 344 | 382 | 508 | 376 | 316 |
| Refractive index | 1.530 | 1.549 | 1.565 | 1.515 | 1.542 | 1.514 | 1.516 | 1.523 |
| Abbe's Number | 60 | 57 | 59 | 59 | 56 | 58 | 58 | 69 |
| Thermal Expansion Coefficient ($10^{-7}$° C.) | 31 | 32 | 36 | — | — | — | 35 | 35 |
| Glass Transition Point (° C.) | 731 | 785 | 777 | — | — | — | 733 | 679 |
| Deformation Point (° C.) | 794 | 843 | 833 | — | — | — | 800 | 752 |

| | Example | | | |
|---|---|---|---|---|
| | 21 | 22 | 23 | 24 |
| Presence of Optical Absorption Peak | | | | |
| 400 nm to 550 nm | Yes | Yes | Yes | Yes |
| Ratio of Peal to Base | 0.67 | 1.08 | 0.39 | 1.01 |
| 650 nm to 750 nm | Yes | Yes | Yes | Yes |
| Fluorescence Spectrum Excited at 500 nm | | | | |
| Peak Wavelength (nm) | 1153 | 1148 | 1125 | 1170 |
| Half-Height Width (nm) | 284 | 278 | 226 | 290 |
| Fluorescence Spectrum Excited at 700 nm | | | | |
| Peak Wavelength (nm) | 1082 | 1110 | 1097 | 1120 |
| Half-Height Width (nm) | 175 | 188 | 171 | 210 |
| Fluorescence Spectrum Excited at 833 nm | | | | |
| Peak Wavelength (nm) | 1252 | 1249 | 1235 | 1270 |
| Half-Height Width (nm) | 353 | 355 | 410 | 280 |
| Lifetime of fluorescence | 289 | 279 | — | 203 |

TABLE 2B-continued

| | | | | |
|---|---|---|---|---|
| (μs) | | | | |
| Refractive index | 1.533 | 1.534 | 1.550 | — |
| Abbe's Number | 58 | 64 | 54 | — |
| Thermal Expansion Coefficient ($10^{-7}$ °C.) | 37 | 38 | 37 | — |
| Glass Transition Point (° C.) | 710 | 733 | 746 | — |
| Deformation Point (° C.) | 763 | 768 | 798 | — |

TABLE 3

| | | Comparative Example | | | |
|---|---|---|---|---|---|
| | | 1 | 2 | 3 | 4 |
| Composition (mol %) | $SiO_2$ | 64.4 | 64.4 | 66.5 | 70.4 |
| | $Al_2O_3$ | 11.9 | 12.9 | 4.9 | 2.3 |
| | $Li_2O$ | 19.8 | 9.9 | 0 | 0 |
| | $Na_2O$ | 0 | 0 | 8.8 | 13 |
| | $K_2O$ | 0 | 0 | 2.8 | 0 |
| | MgO | 3.2 | 69 | 3.9 | 6 |
| | CaO | 0 | 0 | 8.7 | 8 |
| | SrO | 0 | 0 | 1.7 | 0 |
| | BaO | 0 | 0 | 0.2 | 0 |
| | $TiO_2$ | 0 | 0 | 0 | 0 |
| | $ZrO_2$ | 0 | 5.0 | 2.2 | 0 |
| | $Bi_2O_3$ | 1.0 | 1.0 | 0.9 | 0.3 |
| Glass | | Devitrified | Devitrified | Glassy | Glassy |
| Color Tone of Glass | | — | — | Dark Brown | Transparent |
| Optical Absorption Peak | | — | — | No | No |

What is claimed is:

1. The glass composition consisting of the following components, indicated by mol %:
   55 to 80 $SiO_2$;
   5 to 25 $Al_2O_3$;
   0.01 to 5 bismuth oxide in terms of $Bi_2O_3$;
   0 to 15 $Li_2O$;
   0 to 5 $Na_2O$;
   0 to 5 $K_2O$;
   0 to 40 MgO;
   0 to 30 CaO;
   0 to 5 SrO;
   0 to 5 BaO;
   0 to 25 ZnO;
   0 to 10 $TiO_2$;
   0 to 5 $ZrO_2$;
   0 to 10 $B_2O_3$;
   0 to 5 of at least one selected from the group consisting of $Y_2O_3$, $La_2O_3$, $Ta_2O_5$, $Nb_2O_5$, $GeO_2$ and $In_2O_3$;
   0 to 1 of at least one selected from the group consisting of $As_2O_3$, $Sb_2O_3$, $SO_3$, $SnO_2$, $Fe_2O_3$, CL and F, and
   wherein the total of MgO+CaO+SrO+BaO+ZnO is in a range of 0.1 to 40 mol %, and
   wherein the glass composition emits fluorescence in an infrared wavelength region through irradiation of excitation light, with bismuth contained in the bismuth oxide functioning as a fluorescent source.

2. The glass composition according to claim 1, having an optical absorption peak in a wavelength range of 450 nm to 900 nm.

3. The glass composition according to claim 1, having an optical absorption peak in a wavelength range of 450 nm to 550 nm.

4. The glass composition according to claim 1, having an optical absorption peak in a wavelength range of 650 nm to 750 nm.

5. The glass composition according to claim 1, having an optical absorption peak in a wavelength range of 750 nm to 850 nm.

6. The glass composition according to claim 1, wherein a wavelength at which the maximum intensity of the fluorescence that is emitted through the irradiation of excitation light having a wavelength in a range of 400 nm to 900 nm is obtained is in a range of 1000 nm to 1600 nm.

7. The glass composition according to claim 6, wherein a half-height width with respect to the wavelength of the fluorescence that is emitted through the irradiation of excitation light having a wavelength in a range of 400 nm to 900 nm is at least 150 nm.

8. The glass composition according to claim 1, providing a gain in signal light amplification in at least a part of a wavelength range of 1000 nm to 1600 nm through the irradiation of excitation light.

9. The glass composition according to claim 1, providing a gain in signal light amplification in at least a part of a wavelength range of 1000 nm to 1400 nm through the irradiation of excitation light.

10. The glass composition according to claim 1, wherein the content of $Li_2O$ is more than 0.

11. An optical fiber comprising a glass composition according to claim 1.

12. A light amplifier comprising a glass composition according to claim 1.

* * * * *